(12) United States Patent
Green et al.

(10) Patent No.: US 11,919,008 B2
(45) Date of Patent: Mar. 5, 2024

(54) LIFTER BAR, ARRANGEMENT AT GRINDING MILL DISCHARGE END AND METHOD FOR DISASSEMBLING DISCHARGE END OF GRINDING MILL

(71) Applicant: Metso Outotec Finland Oy, Tampere (FI)

(72) Inventors: Nick Green, Oslo (NO); Damon Bordi, Perth (AU); Tuomas Tani, Helsinki (FI); Peter Nilsson, Perth (AU)

(73) Assignee: Metso Outotec Finland Oy, Tampere (FI)

( * ) Notice: Subject to any disclaimer, the term of this patent is extended or adjusted under 35 U.S.C. 154(b) by 0 days.

(21) Appl. No.: 17/921,866

(22) PCT Filed: Jun. 29, 2020

(86) PCT No.: PCT/FI2020/050474
§ 371 (c)(1),
(2) Date: Oct. 27, 2022

(87) PCT Pub. No.: WO2022/003232
PCT Pub. Date: Jan. 6, 2022

(65) Prior Publication Data
US 2023/0166269 A1    Jun. 1, 2023

(51) Int. Cl.
*B02C 17/00* (2006.01)
*B02C 17/18* (2006.01)

(52) U.S. Cl.
CPC ...... *B02C 17/1825* (2013.01); *B02C 17/1855* (2013.01)

(58) Field of Classification Search
CPC .................. B02C 17/1855; B02C 17/1825
See application file for complete search history.

(56) References Cited

U.S. PATENT DOCUMENTS

| 1,058,953 | A | * | 4/1913 | Easton | B02C 17/1855 |
|---|---|---|---|---|---|
| | | | | | 241/70 |
| 1,153,238 | A | * | 9/1915 | Marcy | B02C 17/1855 |
| | | | | | 241/70 |
| 1,153,239 | A | * | 9/1915 | Marcy | B02C 17/1855 |
| | | | | | 241/70 |
| 1,337,033 | A | | 4/1920 | Ball | |
| 3,219,284 | A | | 11/1965 | Son et al. | |
| 3,599,882 | A | | 8/1971 | Sabaski et al. | |

(Continued)

FOREIGN PATENT DOCUMENTS

DE            19638698 A1      3/1998

OTHER PUBLICATIONS

International Search Report and Written Opinion for International Application No. PCT/FI2020/050474, dated Oct. 7, 2020.

*Primary Examiner* — Faye Francis
(74) *Attorney, Agent, or Firm* — Andrus Intellectual Property Law, LLP (57) ABSTRACT

A lifter bar for an open-ended grinding mill that includes an elongated bar structure and at least one groove portion provided in the elongated bar structure. The groove portion is configured to open on the side of the lifter bar facing outwards from the grinding mill volume, when the lifter bar is mounted onto the grinding mill. The groove portion is provided with at least one through hole opening for a mounting member.

12 Claims, 6 Drawing Sheets

(56) References Cited

U.S. PATENT DOCUMENTS

2011/0220752 A1\* 9/2011 Cox .................... B02C 17/1825
                                                29/401.1
2017/0014831 A1\* 1/2017 Mepham ............... B02C 17/183
2017/0304837 A1\* 10/2017 Lauermaa ............... B29C 45/14
2020/0023373 A1\* 1/2020 McPhee .............. B02C 17/1855

\* cited by examiner

```
┌─────────────────────────────────────────────────────────┐
│ Removing at least one grate panel from the outside of the│──110
│ grinding mill.                                          │
└─────────────────────────────────────────────────────────┘
                              │
┌─────────────────────────────────────────────────────────┐
│ Removing after removing grate panel or simultaneously   │──120
│ with removing grate panel at least one lifter bar from the│
│ grinding mill.                                          │
└─────────────────────────────────────────────────────────┘
```

LIFTER BAR, ARRANGEMENT AT GRINDING MILL DISCHARGE END AND METHOD FOR DISASSEMBLING DISCHARGE END OF GRINDING MILL

CROSS-REFERENCE TO RELATED APPLICATIONS

This application is the U.S. national stage application of International Application PCT/FI2020/050474, filed Jun. 29, 2020, which international application was published Jan. 6, 2022, as International Publication WO 2022/003232 A1 in the English language.

BACKGROUND

The invention relates to grinding mills, and more particularly to a lifter bar, an arrangement at a grinding mill discharge end and a method for disassembling a discharge end of a grinding mill.

Grinding mills, specifically semi autogenous and autogenous mills, rely on their ability to generate impact breakage of the ore charge and transport the ground material through the discharge pulp lifters out of the mill. It is common with increasing mill diameters and flow rates for the discharge arrangement to restrict the performance of the mill by limiting material transfer rates and grinding efficiency. This is due to an inability to transport the ground material through the grate and pulp lifters limiting the transfer rate due to slurry flow back/short circuiting and carry over. The impact of this restriction in mill flow rate is a reduction in mill performance (product size) due to the resulting slurry pool which dissipates the energy of the balls/ore impacting the toe of the charge.

Open-ended mills can provide a solution to this problem removing the need for lifting the ground material to a discharge trunnion, since the slurry can flow unhindered though the grate and out of the mill. However, so far the maintenance of open-ended grinding mills has caused some difficulties, since it has been necessary to mount and unmount at least some of the parts from the inside of the grinding mill, whereby at least some work phases have required workers to get inside the grinding mill volume to do some of the maintenance tasks. This typically lengthens the maintenance breaks and can even risk the occupational safety of the workers.

BRIEF DESCRIPTION OF THE INVENTION

An object of the present invention to provide a new lifter bar, a new arrangement at a grinding mill discharge end, and a method for disassembling a discharge end of a grinding mill, which are characterized by what is stated in the independent claims. Some preferred embodiments are disclosed in the dependent claims.

The invention is based on the idea of configuring lifter bars in such a manner that mounting and unmounting of the main parts of the discharge end of an open-ended grinding mill can be done from the outside of the grinding mill.

An advantage of the method and arrangement of the new lifter bar, the new arrangement at a grinding mill discharge end and the new method for disassembling a discharge end of a grinding mill is that the maintenance of the grate is quicker and easier. The method according to the current solution also enables more efficient use of machinery and even robots and automation. The current solution can, therefore, reduce the number and/or duration of maintenance breaks needed and improve occupational safety.

BRIEF DESCRIPTION OF THE DRAWINGS

In the following the invention will be described in greater detail by means of preferred embodiments with reference to the accompanying drawings, in which.

The drawings are for illustrative purposes only and are not shown to scale. For the sake of clarity, not all the similar features have been numbered in the figures.

DETAILED DESCRIPTION OF THE INVENTION

Figure 1:
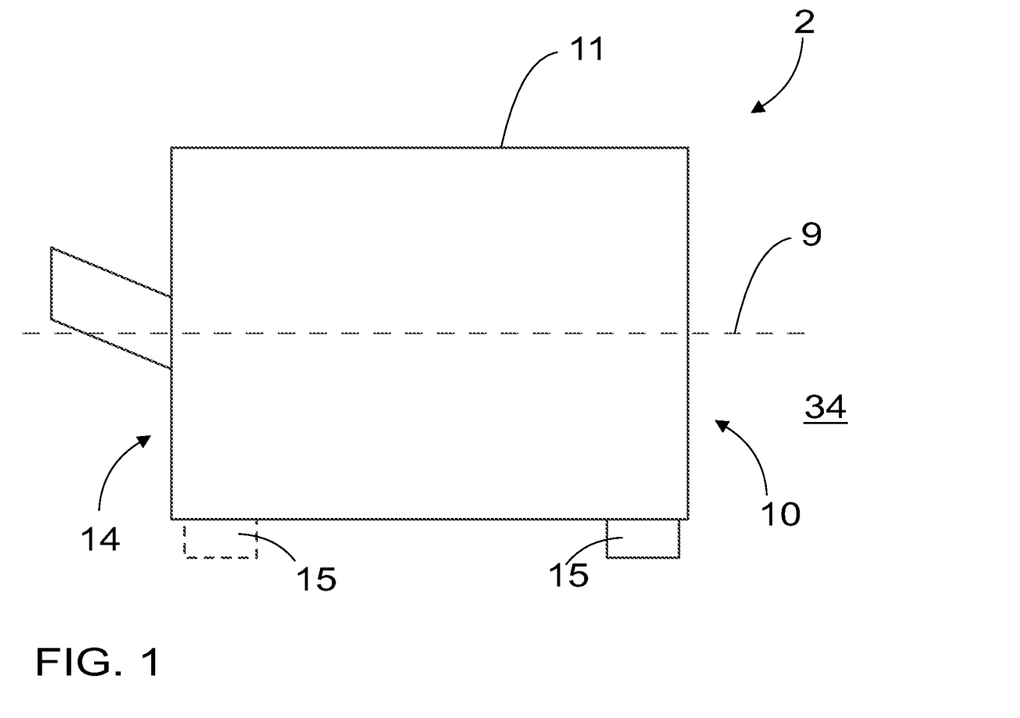
FIG. 1 illustrates schematically a grinding mill seen from a side.
Figure 2:
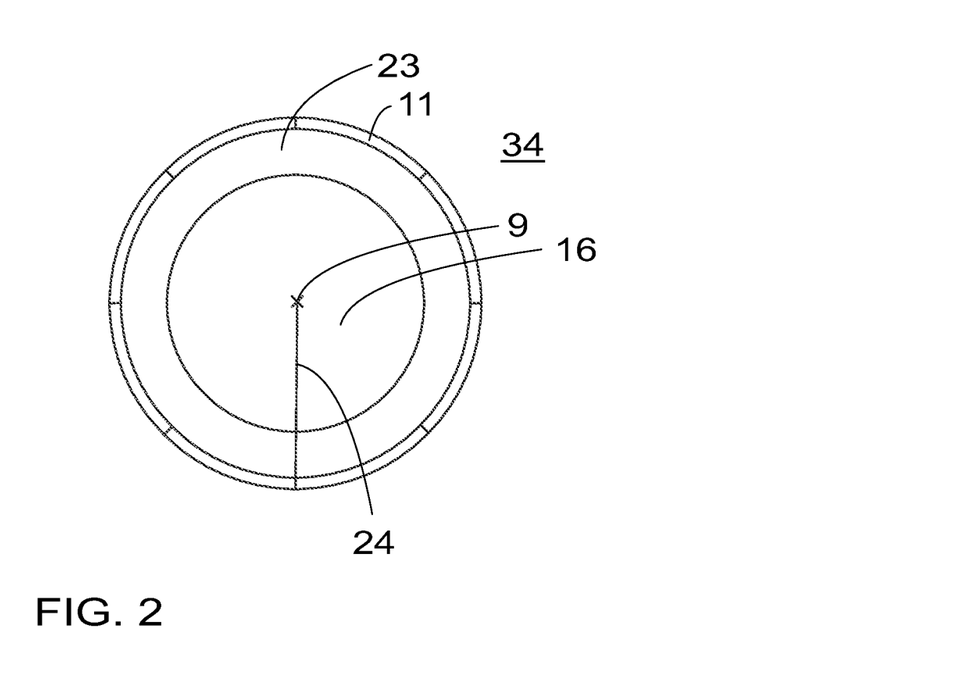
FIG. 2 illustrates schematically a grinding mill seen from a second end.

FIG. 1 illustrates schematically a grinding mill 2. FIG. 2 illustrates schematically a grinding mill 2 seen from a second end 10, in other words the discharge end 10 of the grinding mill. FIGS. 1 and 2 only show some features of the grinding mill 1 that help understanding the current solution. It is clear for a person skilled in the art that a grinding mill may and usually does comprise other features as well.

A grinding mill 2, such as the grinding mill of FIG. 1, comprises a drum comprising a cylindrical shell 11. In a grinding mill 2 of the current solution, the longitudinal axis 9 of the drum is arranged in a substantially horizontal position in a use position of the grinding mill 2. The longitudinal axis 9 of the drum refers to the axis extending along the centre line of the shell 11 from one end of the cylinder-shaped shell to another. Horizontal position refers to the longitudinal axis 9 extending in a substantially horizontal direction. In other words, the longitudinal axis 9 extends in a direction that is closer to a horizontal direction than a vertical direction. The use position refers to a position the grinding mill 2 is arranged in when used for grinding, for instance for ore grinding, in a production environment.

The drum comprises a first end 14 at the feed end of the shell and a second end at the discharge end 10 of the shell. The feed end refers to the end at which the material to be ground is fed into the drum. The discharge end refers to the end at which the ground material is discharged from the drum. In wet grinding applications the discharged material comprising ground material and possibly liquids is also called slurry in this application.

The grinding mill 2 may comprise various process duties including but not limited to a ball mill, a pebble mill, an autogenous mill (AG mill), or a semi-autogenous mill (SAG mill). Working principles of such grinding mills are known and are not explained in more detail in this description.

The grinding mill 2 typically further comprises a bearing 15 supporting the drum at the discharge end 10. The bearing 15 may comprise any suitable type of bearing, such as a rolling element bearing, a hydrostatic bearing or a hydrodynamic bearing. It should also be noted that the grinding mill 2 may also have additional bearings supporting the drum and/or other parts of the grinding mill 2. Such bearings 15 for supporting the drum of the grinding mill are known as such and are not explained in more detail.

A grinding mill 2 may be an open-ended grinding mill. Open-ended grinding mill refers to a grinding mill that does not have a discharge trunnion or a solid discharge head plate.

An open-ended grinding mill may comprise a discharge grate 16 instead of the discharge trunnion and solid discharge head plate, whereby the ground material is discharged through the discharge grate 16. In a fully open-ended grinding mill, there is no need to lift the ground material to discharge it. According to another embodiment, the open-ended grinding mill 2 may comprise a partial head plate 23 at the discharge end, such as in the embodiment of FIG. 2. Such a grinding mill may also be called a semi-open-ended grinding mill. A semi-open-ended grinding mill may be similar to the fully open-ended grinding mill, but it may have a partial head plate 23 at the discharge end of the shell extending partially from a perimeter of the shell 11 towards the longitudinal axis 9 of the drum, but without a discharge trunnion and no traditional pulp lifters. The partial head plate 23 at the discharge end 10 of the shell 11 may extend a distance of preferably less than 50 percent, more preferably less than 30 percent and most preferably less than 15 percent of the length the radius 24 of the shell from the edge of the shell 11 towards the longitudinal axis 9 of the drum. The area of the discharge end 10 of the drum extending from the inner edge of the partial head plate 23 towards the longitudinal axis 9 of the drum may define a discharge opening. The discharge opening may be provided with a discharge grate 16. In both types of open-ended grinding mills, in other words in both fully open-ended and semi-open-ended grinding mills, the ground material may, thus, be discharged from the discharge grate 16 straight to the atmosphere.

Figure 3:
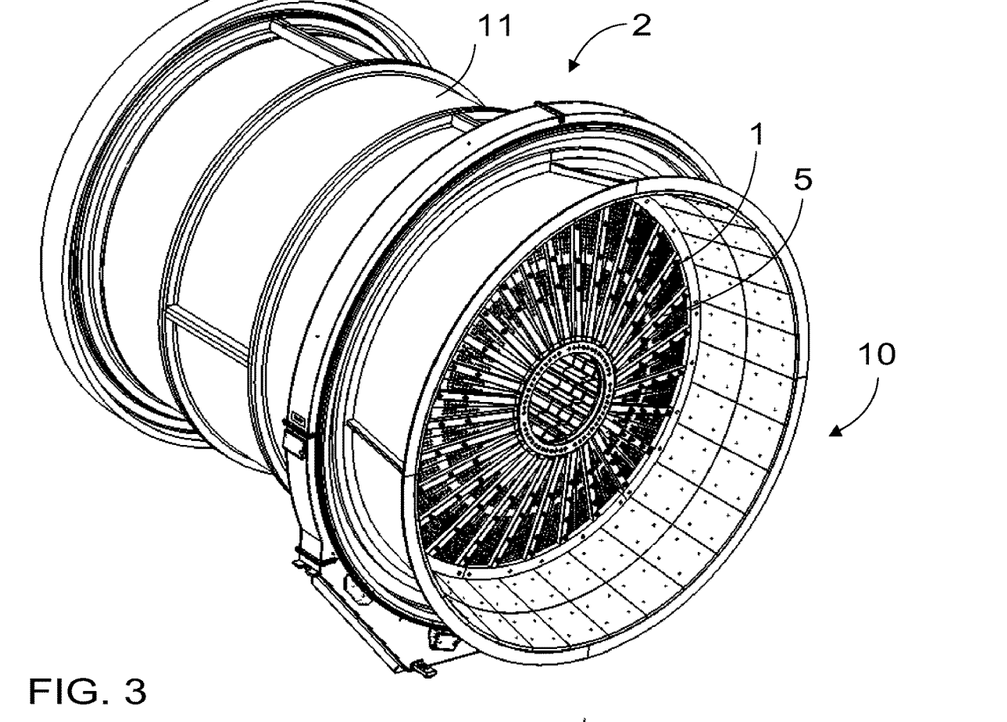
FIG. 3 shows a part of an open-ended grinding mill in perspective.
Figure 4:
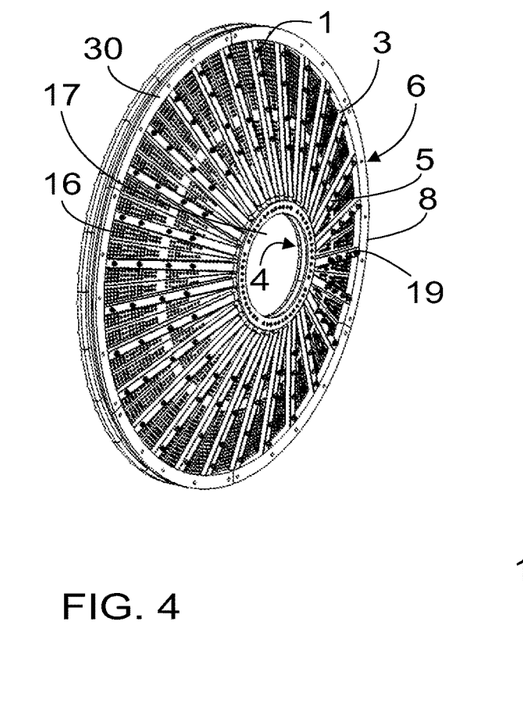
FIG. 4 shows a detail from a discharge end of an open-ended grinding mill in perspective.
Figure 5:
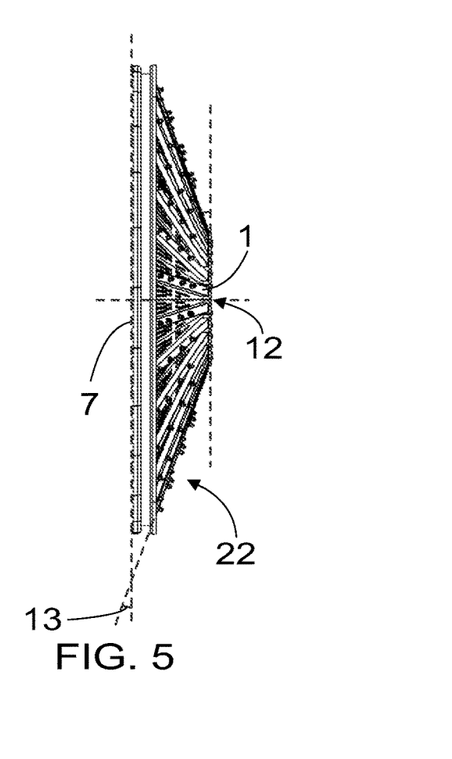
FIG. 5 shows a detail from a discharge end of an open-ended grinding mill shown from a side of the grinding mill.
Figure 6:
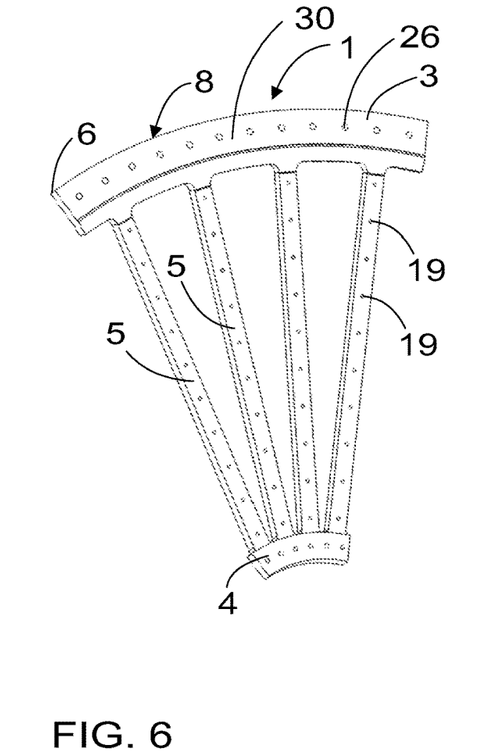
FIG. 6 shows a grate support element.
Figure 7:
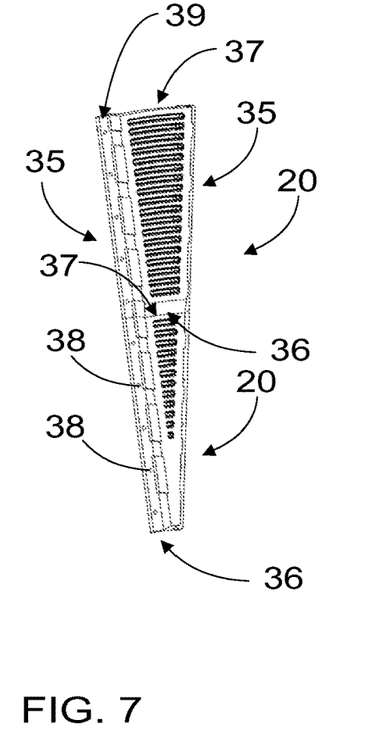
FIG. 7 shows a grate panel shown in perspective from the side configured to be directed to the inside of the grinding mill.

FIG. 3 shows a part of a grinding mill 2, more particularly a part of an open-ended grinding mill 2, in perspective, FIG. 4 shows a detail from a discharge end of an open-ended grinding mill in perspective, and FIG. 5 shows a detail from a discharge end of an open-ended grinding mill shown from a side of the grinding mill. FIG. 6 shows a grate support element, and FIG. 7 shows a grate panel shown in perspective from the side configured to be directed to the inside of the grinding mill. The embodiments shown in the FIGS. 3 to 7 are shown as examples only to explain the context and the terminology used in this description. It is clear for a person skilled in the art that the actual embodiments of the grinding mill, discharge end of an open-ended grinding mill, grate support element and grate panel may vary, and that the lifter bar, arrangement at grinding mill discharge end and method for disassembling discharge end of a grinding mill described in this description may be provided in connection with different embodiments of a grinding mill, a discharge end of an open-ended grinding mill, a grate support element and a grate panel as well.

Referring to the FIGS. 3 to 7, in an embodiment, a grate support element 1 for an open-ended grinding mill 2 may comprise an outer perimeter section 3, an inner section 4, and at least one vane 5. The vane 5 may be configured to extend between the outer perimeter section 3 and the inner section 4, for instance in a direction radial with respect to the outer perimeter 6 of the grate support element 1 or in a curved manner.

The grate support element 1, thus, refers to an element configured to be mounted at a discharge end 10 of a shell 11 of the open-ended grinding mill 2 and to support one or more grate panel(s) of the open-ended grinding mill 2. The inner section 4 refers to the section of the grate support element 1, which is provided at the end of the grate support element 1 that is directed towards the middle 12 of the cross section of the grinding mill 2 at the discharge end 10, when the grate support element 1 is mounted to the grinding mill 2. Similarly, the outer perimeter section 3 refers to the section of the grate support element 1, which is provided at the end of the grate support element 1 that is directed away from the middle 12 of the cross section of the grinding mill 2 at the discharge end 10, when the grate support element 1 is mounted to the grinding mill 2, in other words at the distal end of the grate support element 1.

Figure 8:
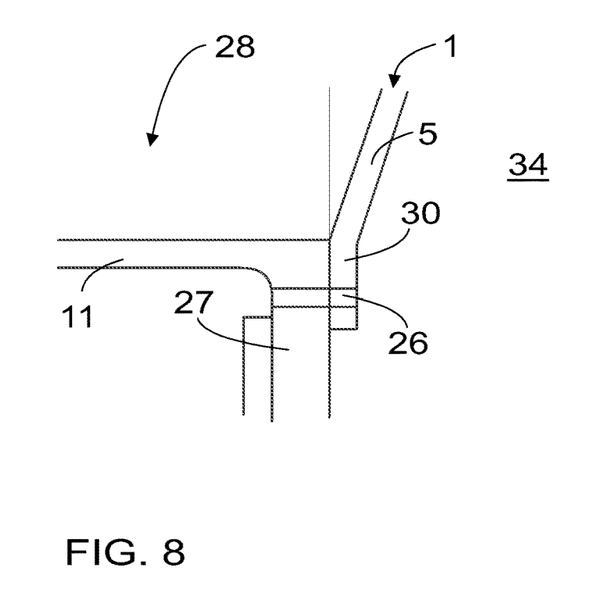
FIG. 8 shows a detail of a grinding mill at the discharge end according to an embodiment.

FIG. 8 shows a detail of a grinding mill at the discharge end according to an embodiment.

According to an embodiment, a grate support element 1 for supporting a grate 16 of an open-ended grinding mill 2 may comprise an outer perimeter section 3 directed towards a middle 12 of the cross section of the grinding mill 2 in the transverse direction of the grinding mill 2, an inner section 4 directed away from the middle 12 of the cross section of the grinding mill 2 in the transverse direction of the grinding mill, and at least one vane 5 extending between the outer perimeter section 3 and the inner section 4 in such a manner that the vane 5 has an inner section side end connected to the inner section 4 and an outer perimeter section side end connected to the outer perimeter section 3. The vane 5 extending between the outer perimeter section 3 and the inner section 4 in such a manner that the vane 5 has an inner section side end connected to the inner section 4 and an outer perimeter section side end connected to the outer perimeter section 3 refers to the vane having a first end at the outer perimeter section and another end a second end at the inner section of the grate support element.

According to an embodiment, the grate support element 1 may further comprise a mounting flange 30 at the outer perimeter of the grate support element 1. The mounting flange 30 is configured to enable mounting of the grate support element 1 to a shell 11 of the grinding mill 2 at an area of the shell not intruding to the grinding mill volume 28. The mounting flange 30 may extend outwards from the middle 12 of the cross section of the grinding mill 2. In other words, the mounting flange 30 may extend from the outer perimeter end of the vane 5 in a direction directed outwards from the middle 12 of the cross section of the grinding mill 2. Thus, the mounting flange 30 may form a flange with a shape of a ring or a section of a ring at the outer perimeter section 3 part of the grate support element 1. Thereby, the mounting flange 30 may be configured to extend beyond the inner perimeter of the shell 11 at the discharge end 10 and not to extend to the area of the discharge end opening of the shell 11, when the grate support element 1 is mounted to the grinding mill 2, for example to the shell 11. Thus, the mounting flange 30 may be configured to be mounted to the discharge end face of the grinding mill 2, and the shell 11, and not to protrude into the inside or inner volume 28 of the shell 11, when the grate support element 1 is mounted to the grinding mill 2 via the mounting flange 30.

According to an embodiment, the mounting flange 30 may be provided with flange openings 26 configured for bolts for mounting the grate support element 1 to the grinding mill 2. The flange openings 26 may be configured to extend through the mounting flange 30 in a horizontal direction, when the grate support element 1 is mounted in the grinding mill 2. In other words, the flange openings 26 may be configured to extend in the longitudinal direction of the grinding mill 2, when the grate support element 1 is mounted to the grinding mill 2. According to another embodiment, at least some of the flange openings 26 may be configured as blind holes.

According to an embodiment, the mounting flange 30 may be configured to extend outwards beyond a diameter of an inner volume 28 of the shell 11 of the grinding mill 2, when the grate support element 1 is mounted in the grinding mill 2. In other words, the mounting flange 30 may be configured not to protrude inside the area inside the inner perimeter of the cylindrical shell 11 of the grinding mill 2, when the grate support element 1 is mounted to the grinding mill 2. This has many benefits including not limiting the flow of ground material and avoiding a surface of high wear and a point of stiffness discontinuity at the discharge end of the shell 11.

According to an embodiment, the grate support element 1 may comprise a mounting surface parallel to the end of the of the shell 11 of the grinding mill 2. Preferably, this mounting surface comprises a surface within the area of the mounting flange 30. More preferably, this mounting surface comprises a surface within the area of the mounting flange 30 configured to be directed towards the shell 11, when the grate support element 1 is mounted to the grinding mill 2, such as to the discharge end of the shell.

According to an embodiment, the vane 5 extends between the outer perimeter section 3 and the inner section 4 in a direction radial with respect to the cross section of the grinding mill 2 in the transverse direction. In such an embodiment, the vanes 5 may be thus be configured to extend radially from the outer perimeter of the discharge end of the shell 11, when a plurality of grate support elements 1 or one or more grate support elements 1 comprising a plurality of vanes 5 are mounted to the grinding mill 2.

According to an embodiment, the vane 5 extends between the outer perimeter section 3 and the inner section 4 in a curved manner. In such embodiments, the vanes may be configured to curve for instance in a direction of a plane defined by the vanes 5 or in a direction transverse to the direction of the plane defined by the vanes 5. The plane defined by the vanes refers to a plane defined by the direction, in which the vane 5 extends from the outer perimeter section 3 towards the inner section 4. Thus, a curve in a direction of the plane refers to the vane being curved, or angled, with respect to the radial direction directed from the outer perimeter edge 8 towards the middle 12 of the cross section of the grinding mill 2, when the grate support element 1 is mounted to a grinding mill 2. The vane 5 may for instance be configured to extend from the outer perimeter section 3 towards the inner section in a spiraling manner. Similarly, a curve in a direction transverse to the direction of the plane defined by the vanes 5 refers to the vane 5 being configured to be curved towards and/or outwards from the volume of the grinding mill 2, when mounted to the grinding mill 2. According to an embodiment, the angle or the curvature may vary along the length of the vane 5.

According to an embodiment, an open-ended grinding mill 2 comprises a shell 11 comprising an inner volume 28 for material to be ground and at least one grate support element 1 according to an embodiment described in this description, or a combination of such embodiments, mounted to the shell at a discharge end 10 of the grinding mill 2. According to an embodiment, the shell 11 comprises a shell flange 27 extending in a radial direction away from the inner volume of the shell 11, and the grate support element 1 is mounted via the mounting flange 30 to the shell flange 27.

According to an embodiment, the mounting flange 30 and the shell flange 27 are provided with flange openings 26 for bolts for mounting the grate support element 1 to the shell 11. Preferably, at least some of the flange openings 26 are configured to be aligned when the grate support element 1 is mounted to the shell 11. The flange openings 26 in the mounting flange 30 and in the shell flange 26 are preferably configured to extend through the mounting flange 30. The grate support element 1 is preferably mounted to the shell 11 by bolts extending in a horizontal direction through the flange openings 26 in both the mounting flange 30 and the shell flange 27, when the grate support element 1 is mounted in the grinding mill 2 and the grinding mill 2 is in a use position.

According to an embodiment, the vane 5 is provided with at least two vane openings 19 along its length for attaching the grate support element 1 to a grate panel 20.

According to an embodiment, the vane 5 may be angled with respect to a plane 7 defined by the outer edge 8 of the outer perimeter section 3 in such a manner that the inner section 4 is configured to be provided outwards from the plane 7 defined by the outer edge 8 of the outer perimeter section 3, when the grate support element 1 is mounted to the open-ended grinding mill 2. Thus, the vane 5 may be angled with respect to a plane defined by the outer perimeter of the grate support element 1. In other words, the inner section 4 may protrude outwards from the grinding mill volume 28, when the grate support element 1 is mounted to the open-ended grinding mill 2, more particularly at a discharge end 10 of the open-ended grinding mill 2.

According to another embodiment, the grate support element 1 may be flat. In other words, the vane 5 may extend in a direction parallel, or substantially parallel, to the plane 7 defined by the outer edge 8 of the outer perimeter section 3, instead of being angled to the plane. In such an embodiment, the grate support element 1 in its entirety may, thus, be configured to be positioned into a vertical position when mounted to the grinding mill 2, instead of protruding outwards from the volume 28 of the grinding mill 2. The embodiments may otherwise be similar to one another and comprise similar features and combinations thereof.

According to an embodiment, the angle 13 between the vane 5 and the plane 7 defined by the outer edge 8 of the outer perimeter section 3 is in the range of 5 to 30 degrees. In other words, the vane 5 protrudes outwards from the grinding mill volume, in other words from the inside of the shell 11, at an angle 13 in the range of 5 to 30 degrees, when the grate support element 1 is mounted to the open-ended grinding mill 2, more particularly at a discharge end 10 of the open-ended grinding mill 2.

According to an embodiment, the angle 13 between the vane 5 and the plane 7 defined by the outer edge 8 of the outer perimeter section 3 may vary at one, two or more points along the length of the vane or continuously over the length of the vane. In other words, the angle 13 between the vane 5 and the plane 7 defined by the outer edge 8 of the outer perimeter section 3 may be different at different portions of the length of the vane 5 along the length of the vane 5 extending from the outer perimeter section 3 towards the inner section 4. According to another embodiment, the angle 13 between the vane 5 and the plane 7 defined by the outer edge 8 of the outer perimeter section 3 may be arranged to vary continuously over the length of the vane 5. In such an embodiment, the vane 5 may thus be angled in a curved manner with respect to the plane 7 defined by the outer edge 8 of the outer perimeter section 3. In a further embodiment, the vane 5 may comprise a same angle with respect to the plane 7 defined by the outer edge 8 of the outer perimeter section 3 along a first portion of the length of the vane 5 and a continuously varying angle along a second portion of the length of the vane 5.

According to an embodiment, the grate support element 1 comprises a shape of a conical wheel or a conical disc, or a shape of a section of a conical wheel or a conical disc. The grate support element 1 comprising a shape of a section of a conical wheel or a conical disc refers to such a shape that a plurality of grate support elements 1 arranged adjacently to one other in such a manner, that their inner sections 4 are directed to a common middle point and their outer perimeter sections 3 are directed away from the common middle point, form a conical wheel shape or a conical disc shape.

According to an embodiment, in the grate support element 1, the vanes 5 may be provided at an angle 13 in relation to cross-sectional plane 7 of the open-ended grinding mill 2 in such a manner that the middle end of the grate support element 1, in other words the inner section 4, protrudes away from a grinding mill volume 28 side of the grate support element 1.

According to an embodiment, the inner section 4 connecting the vanes 5 at the middle end of the grate support element 1 is configured to form a ring-like inner perimeter for the grate support element, such as in the embodiments of FIGS. 3 to 6. According to another embodiment, the inner section 4 connecting the vanes 5 at the middle end of the grate support element 1 is configured to form a solid round centre part for the grate support element 1.

According to an embodiment, the grate support structure 22 comprises an aperture 17 in the middle part of the grate support structure 22, the aperture 17 being defined by the inner section(s) 4 of the grate support element(s) 1, more particularly defined by inner perimeters of inner sections 4 configured to form a ring-like inner perimeter. According to an embodiment, the aperture 17 has a diameter in a range of 0 to 50 percent of the radius 24 of the outer perimeter of the grate support structure 22.

According to an embodiment, the grate support element 1 and a grate panel 20 are attached fixedly to one another to form a uniform structure. According to another embodiment, one grate support element 1 alone forms a grate support structure 22.

According to an embodiment, a grate support structure 22 comprises at least two grate support elements 1 described in this description and the accompanying drawings.

According to an embodiment, an open-ended grinding mill 2 comprises a grate support structure 22 and/or at least one grate support element 1 described in this description. According to an embodiment, such an open-ended grinding mill 2 further comprises a grate 16 and a cylindrical shell 11, and the grate support structure 22 is mounted to the grate 16 and the cylindrical shell 11. According to a further embodiment, the grate support structure 22 is mounted removably at least to the cylindrical shell 11.

According to an embodiment, in an open-ended grinding mill 2 described in this description, the middle part of the grate support structure 22 comprising the inner section of the grate support structure 22 extends outwards from the cylindrical shell. More particularly, in such an embodiment, the middle part of the grate support structure 22 comprising the inner section of the grate support structure 22 extends outwards from the cylindrical shell 11 in the longitudinal direction of the cylindrical shell 11.

According to an embodiment, a grate panel 20 may comprise the whole sector or segment of the grate 16 or two or more grate panels may be configured to be mounted adjacent to one another in a radial direction along a vane 5 of a grate support element 1 and/or circumferentially.

Figure 9:
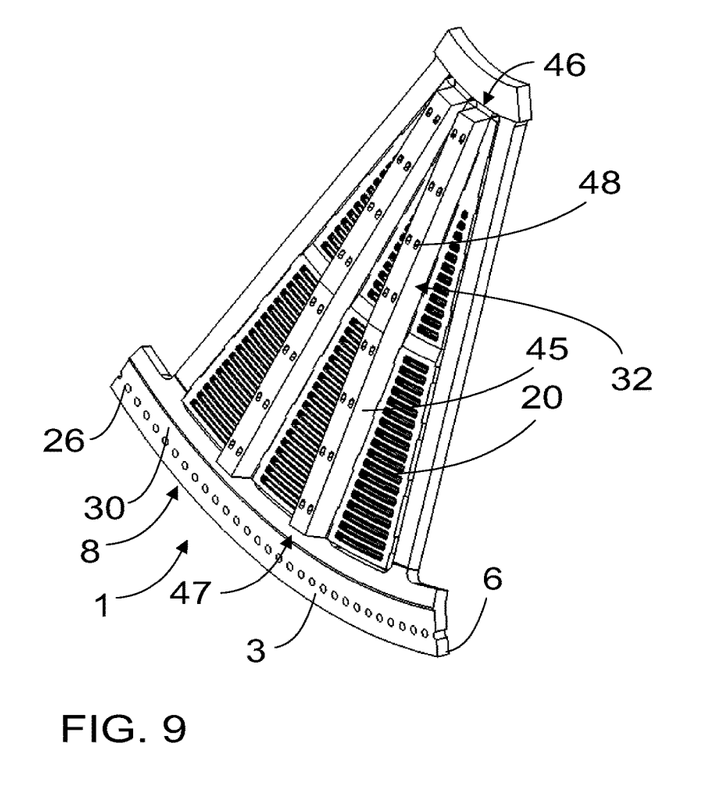
FIG. 9 illustrates a detail from a discharge end of a grinding mill shown from the side directed towards the volume of the grinding mill.
Figure 10:
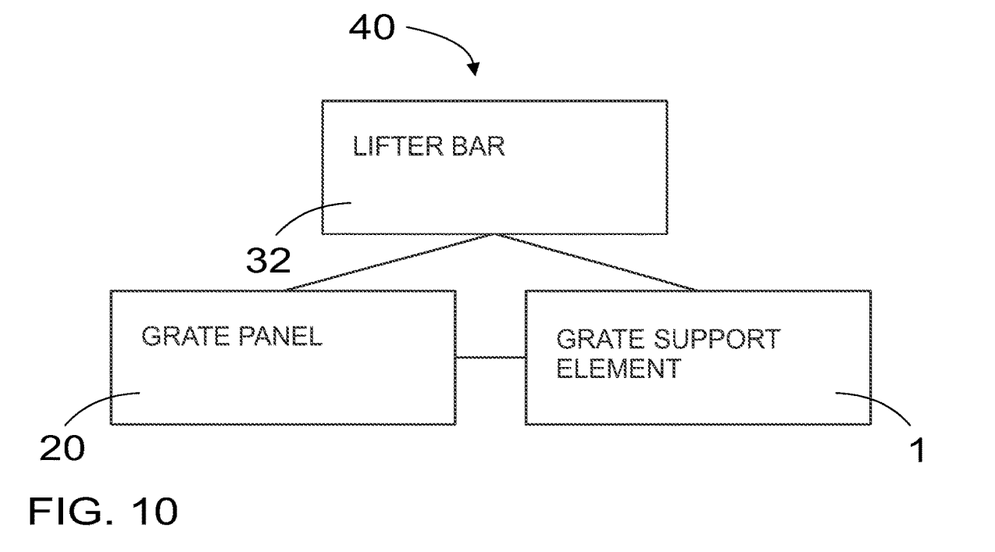
FIG. 10 illustrates an arrangement at a grinding mill discharge end.
Figure 11:
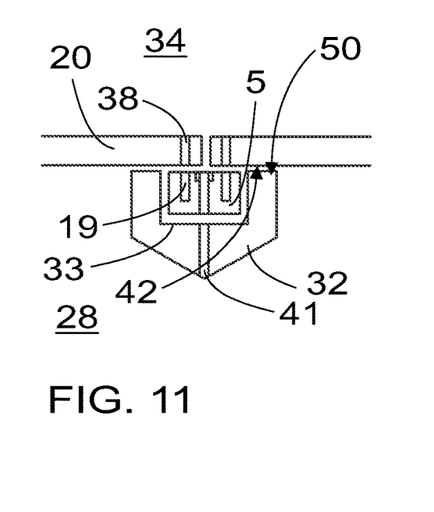
FIGS. 11 and 12 illustrate schematically details of cross sections of lifter bars according to different embodiments.
Figure 12:
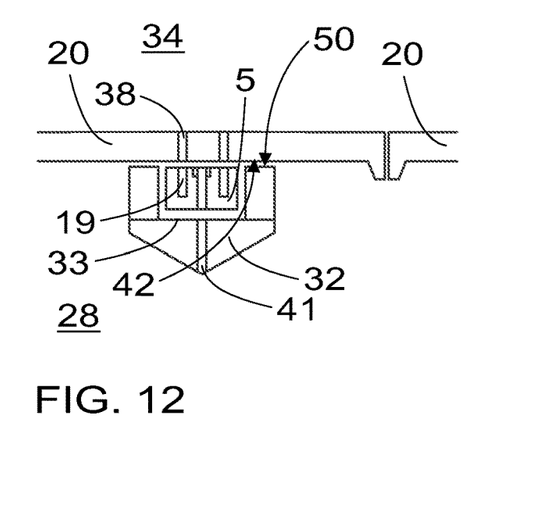

FIG. 9 illustrates a detail from a discharge end of a grinding mill shown from the side directed towards the volume of the grinding mill, in other words from the inside of the grinding mill, FIG. 10 illustrates an arrangement at a grinding mill discharge end, and FIGS. 11 and 12 illustrate schematically details of cross sections of lifter bars according to different embodiments.

In the embodiments of FIGS. 9, 11 and 12, for example, a lifter bar 32 comprises an elongated bar structure 45 and at least one groove portion 33 pros vided in the elongated bar structure. The groove portion 33 is preferably configured to open on the side of the lifter bar facing outwards from a grinding mill volume 28, when the lifter bar is mounted onto the grinding mill 2. In an embodiment, where the lifter bar 32 is configured to be mounted to the grinding mill together with a grate panel, and possibly also with a vane 5 of a grate support element 1, the groove portion 33 is thus configured to open towards the grate panel 20, when the lifter bar 32 is mounted, together with a grate panel 20 and/or a grate support element 1, at a discharge end 10 of a grinding mill 2.

According to an embodiment, the grate panel 20 may be provided with openings 38. These openings 38 may be used to mount the grate panel 20 to the grate support element 1 and/or the lifter bar 32.

A grate panel 20 may comprise two sides 35, an inner end 36 and an outer end 37. According to different embodiments, a grate panel 20 may comprise a whole sector or segment of the grate 16 or two or more grate panels may be configured to be mounted adjacent to one another in a radial direction along a vane 5 of a grate support element 1 and/or circumferentially. The inner end 36 of the grate panel 20 refers to the end of the grate panel 20 configured to be directed towards the middle 12 of the cross section of the grinding mill 2, when the grate panel 20 is mounted to a grinding mill 20. The outer end 37 of the grate panel 20 refers to the end of the grate panel 20 configured to be directed towards the outer perimeter of the grinding mill 2, or in other words away from the middle 12 of the cross section of the grinding mill 2, when the grate panel 20 is mounted to a grinding mill 20.

In conventional pulp discharge systems, lifters are formed as a part of the grate panels and used to both improve the wear life of the grate panels and to agitate the grinding mill content, in other words the material to be ground. Unlike in the conventional solutions, a lifter bar 32 described in this description, on the other hand, is thus an individual wear part. In other words, the lifter bar 32 is a wear part separate from for instance the grate panel 20. This is beneficial, since the service lives of a lifter bar 32, a grate support element 1 and a grate panel 20 described in this description often vary and this enables maintenance of these parts separately from one another.

According to an embodiment, the groove portion 33 is configured to conform to the shape of a vane 5 of a grate support element 1 fully or at least partly in such a manner, that the vane 5 may be placed fully or partly inside the groove portion 33. According to an embodiment, the clearance between the groove portion 33 in the lifter bar 32 and the vane placed in the groove portion 33 is sized to pros vide a maximum contact area between the counter surfaces of the vane 5 and the groove portion 33. This can provide a maximal support for the lifter bar and grate as a whole.

According to an embodiment, the lifter bar 32 comprises at least on each side of the groove portion 33 in the cross sectional direction of the lifter bar 32 a counter surface 50 configured to be directed towards the outside 34 of the grinding mill 2. Thus, the counter surface 50 is also directed towards the grate panel 20, when the lifter bar 32 is mounted to the grate panel 20 and/or together with the grate panel 20 to a grinding mill 2 at a discharge end of the grinding mill 2. The counter surface 50 may be configured to conform to the surface 42 of the grate panel 20 and to be positioned against it, when the lifter bar 32 is mounted to the grate panel 20. The counter surface 50 may also extend at least at one of the ends of the lifter bar 32, namely at the lifter bar inner end 46 and/or the lifter bar outer end 47, in embodiments, in which the groove portion 33 does not extend all the way to the very end of the lifter bar 32 at least at one of the ends 46, 47 of the lifter bar.

In the embodiments of FIGS. 9, 11, 12, 14, 15 and 16, the groove portion 33 is provided with at least one through hole opening 41 for a mounting member 48, such as a bolt or similar. In different embodiments, the groove portion 33 may comprise two or more through hole openings 41.

According to an embodiment, the groove portion 33 may extend along the whole length of the lifter bar 32, in other words from the lifter bar inner end 46 directed towards the middle 12 of the cross section of the grinding mill 2 to the lifter bar outer end 47 directed away from the middle 12 of the cross section of the grinding mill 2. According to another embodiment, the groove portion 33 may only extend along a portion of the length of the lifter bar 32, for instance at the lifter bar inner end 46, at the lifter bar outer end 47 or a portion provided between the lifter bar inner end 46 and the lifter bar outer end 47.

According to an embodiment, at least one of the groove portions 33 has a U-shaped, V-shaped, cut-V-shaped, half-U-shaped, half-V-shaped or half-cut-V-shaped cross section, when seen from an end 46, 47 of the lifter bar 32. The U-shapes and half-U-shapes may be angular, such as in the embodiments of FIGS. 11, 12 and 16, or they may be rounded, fully forming a true U-shape or partly, such as in the embodiment of FIG. 14. The cut-V-shapes and half-cut-V-shapes may be cut at both the side of the groove portion 33 configured to be directed towards the volume 28 of the grinding mill 2, in other words at the bottom of the "V", and at the side of the groove portion 33 configured to be directed outwards from the volume 28 of the grinding mill 2, in other words at the sides of the "V", as in the embodiment of FIG. 15, or at just one of the sides, in other words just at the bottom or just at the sides of the "V". The cross section of the groove portion 33 and/or vane 5 may vary, as long as they are configured to fit each other and the groove portion 33 is configured to open on the side of the lifter bar 32 configured to be directed outwards from the volume 28 of the grinding mill 2.

According to an embodiment, the groove portion 33 may be provided as a recess in the lifter bar 32. Examples of such embodiments are shown for instance in FIGS. 11, 12, 14, 15 and 16. According to another embodiment, the groove portion 33 may be provided by forming protrusions on both sides of the groove portion 33, either instead of or in addition to providing a recess in the lifter bar 32. The protrusions may be provided as an integral part of the lifter bar 32, or as separate protrusion parts, which may be attached to the lifter bar 32 fixedly or removably, as in the embodiment of FIG. 12.

According to an aspect, an arrangement 40 at a grinding mill discharge end comprises at least one lifter bar 32 according to an embodiment described in this description or accompanying figures or a combination of such embodiments, at least one grate panel 20, such as a grate panel 20 according to an embodiment described in this description or accompanying figures or a combination of such embodiments, and at least one grate support element 1, such as a grate support element according to an embodiment described in this description or accompanying figures or a combination of such embodiments.

According to an embodiment, in an arrangement 40 at a grinding mill discharge end, each grate support element may comprise at least one vane 5 and one such vane 5 may be at least partly provided in the groove portion 33 of the lifter bar 32, more particularly on the side of the lifter bar 32 configured to be directed outwards from the volume 28 of the grinding mill 2. The vane 5 may be configured to be provided in the groove portion 33 of the lifter bar 32 between the lifter bar 32 and the grate panel 20.

Figure 16:
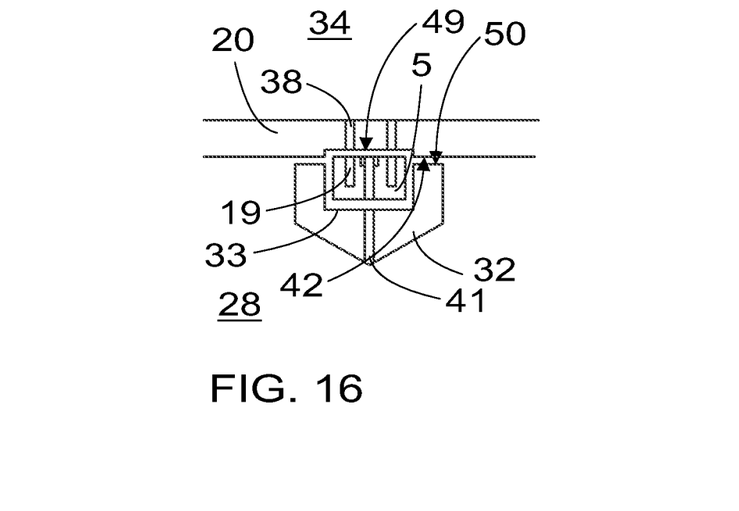

According to a further embodiment, also the grate panel may be provided with a groove 49 configured to be directed towards the volume 28 of the grinding mill, the groove portion 33 of the lifter bar 32 and the groove 49 of the grate panel 20 may be configured to be at least partly aligned, and the vane 5 may be configured to be provided in the groove portion 33 of the lifter bar 32 and the groove 49 of the grate panel 20 between the lifter bar 32 and the grate panel 20. An example of such an embodiment is shown in FIG. 16.

According to an embodiment, the vane 5 may be provided entirely in the groove portion 33. According to another embodiment, only a part of the cross section of the vane 5 may be provided inside the groove portion 33. In other words, at least a part of the vane 5 may be configured to extend to outside of the groove portion 33, such as to extend towards the a grate panel 20, when the lifter bar 32 and the grate panel 20 are mounted to the grate support element 1, and more particularly to the vane 5.

According to an embodiment, a part of the grate panel 20 or wear liner may be provided inside the groove portion 33.

According to an embodiment, the lifter bar 32 is provided on one side of the grate support element 1 and the grate panel 20 is provided on the opposite side of the grate support element 1. Preferably, the lifter bar 32 is provided on the grinding mill volume 28 side of the grate support element 1, and more particularly the vane 5 of the grate support element 1, and the grate panel 20 is provided on the side of the grate support element 1, and more particularly the vane 5 of the grate support element 1, directed to the outside 34 of the grinding mill volume 28. This is beneficial since the grate support structure 1 typically has the longest service life of these three parts. Thereby, the grate panel 20 and/or the lifter bar 32 more prone to wear can be removed and replaced without removing the grate support element 1 from the grinding mill 2. On the other hand, the lifter bar 32, thus, also protects the vane (s) 5 of the grate support structure 1, as its primary function. Similarly, the grate panel 20 mounted on the opposing side of the vane 5 shares this function by also protecting the vane 5 for its part. This further improves the service life of the grate support element 1.

According to an embodiment, in an arrangement a grate support element vane 5 is preferably provided in a groove portion 33 of a lifter bar 32 on the side of the lifter bar 32 directed to outside 34 of the grinding mill volume 28, at least some of the openings 41, 38, 19 for mounting members in the lifter bar 32 and the grate panel 20 and/or the grate support element 1 are configured to be aligned, when a grate support element vane 5 is provided in a groove portion 33 of the lifter bar 32, and the vane 5 is mounted to the lifter bar 32 and/or to the grate panel 20 by mounting members arranged in the aligned openings 41, 19, 38. According to an embodiment, the mounting members 48 mounting the vane 5 to the lifter bar 32, or at least some of these mounting members 48, may also be used for mounting the vane 5 to the grate panel 20, whereby at least one opening 41, 19, 38 in each of the lifter bar 32, vane 5 and grate panel 20, respectively, is aligned. According to another embodiment, such as the embodiments of FIGS. 11, 12, 14 and 15, separate mounting members 48 are used for mounting the vane 5 to the lifter bar 32 and to the grate panel 20.

According to an embodiment, all the openings 41, 19, 38 in each of the lifter bar 32, the vane 5 and the grate panel 20, respectively, are aligned. In such an embodiment, the same mounting members 48 may be used to mount the lifter bar 32, vane 5 and grate panel 20 together. According to another embodiment, some of the openings 41, 19, 38 in each of the lifter bar 32, the vane 5 and the grate panel 20, respectively, are aligned, and some openings 41, 19, 38 are only aligned between the lifter bar 32 and the vane 5 and, on the other hand, between the vane 5 and the grate panel 20. In other words, some of the mounting members 48 may be configured to mount the lifter bar 32, vane 5 and grate panel 20 together, some of the mounting members may be configured to mount the lifter bar 32 and the vane 5 together, and some of the mounting members may be configured to mount the vane 5 and the grate panel 20. This may be beneficial, when the wear parts are removed one by one, or only one or some of the parts are removed from the discharge end 10, since the non-aligned openings may enable some of the mounting members to hold the rest of the parts in place, while one or some of the other parts is being removed from the discharge end 10.

According to an embodiment, a grate support element 1 for an open-ended mill 2 comprises at least three vanes 5 extending from a distal end of the grate support element, in other words from the outer perimeter 6 of the grate support element 1, towards the middle end of the grate support element 1 directed towards the middle 12 of the cross section of the open-ended grinding mill 2, and an inner section 4 connecting the vanes 5 at the middle end of the grate support element 1. Preferably, each vane 5 may be provided with at least one opening 19 for a mounting member configured to align with at least one of the through hole openings of a grate panel 20 and/or at least one of the openings 41 of the lifter bar according to an embodiment described in this description and accompanying figures or a combination thereof, when the lifter bar 32 and the grate support element 1 are mounted to the grate panel 20.

According to an embodiment, the arrangement comprises at least one a wear liner mounted to at least one vane 5 of a grate support element 1. According to a further embodiment, the wear liner comprises at least one opening (not shown) configured to be aligned with at least one opening 19 of the grate support element, when the wear liner or the lifter bar 32 is mounted to the grate support element 1, and the wear liner or the lifter bar 32 is mounted to the vane 5 of the grate support element 1 via the same mounting member that mounts the grate support element 1 to the grate panel 20.

According to an embodiment, grate panels 20 form a surface 42 that interfaces with the wear liner or the lifter bar 32 mounted to the vane(s) 5 in such a manner that a seamless wear surface is formed. In this context, the wear surface refers to the surface of the arrangement 40 directed towards the volume 28 of the grinding mill 2 and is, thus, provided in contact with the material to be ground and, therefore, subject to wear.

Figure 13:
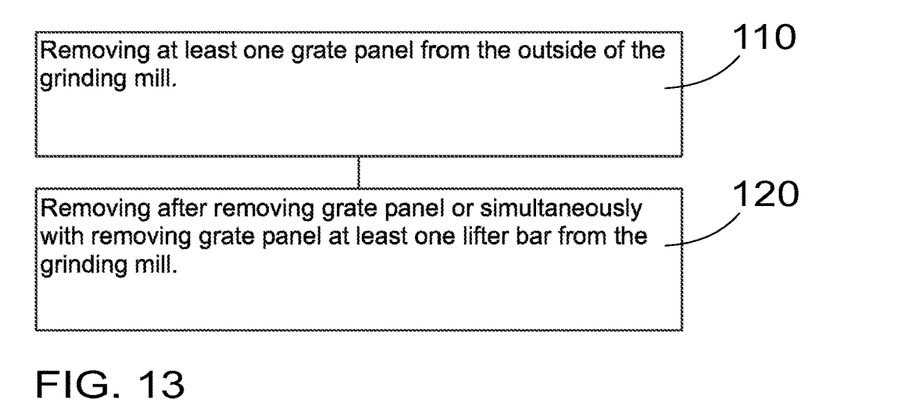
FIG. 13 illustrates an embodiment of a method for disassembling a discharge end of a grinding mill.
Figure 14:
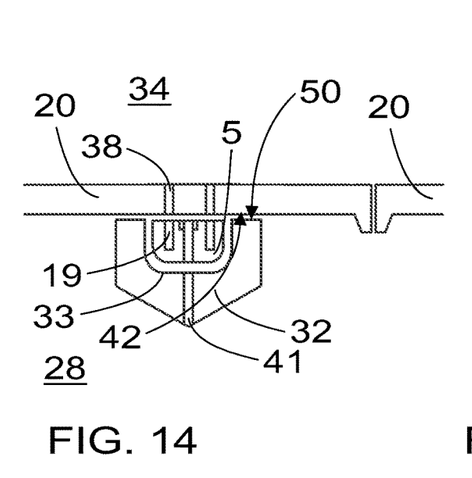
FIGS. 14, 15 and 16 illustrate schematically details of cross sections of lifter bars according to further embodiments.
Figure 15:
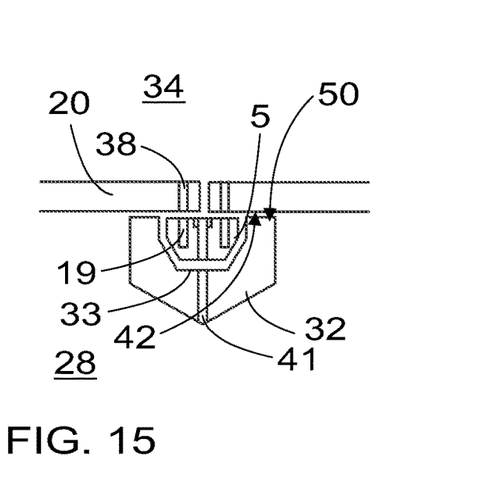

FIG. 13 illustrates an embodiment of a method for disassembling a discharge end 10 of a grinding mill 2. Such a method for disassembling a discharge end 10 of a grinding mill 2 may comprise removing 110 at least one grate panel 20, such as a grate panel 20 according to an embodiment described in this description and accompanying drawings or a combination of the embodiments, from the outside 34 of the grinding mill 2, and removing 120 after removing the grate panel 20 or simultaneously with removing the grate panel 20 at least one lifter bar 32 according to an embodiment described in this description and accompanying drawings or a combination of the embodiments from the discharge end 10 of the grinding mill 2. In other words, the grate panel may be accessed and disassembled from the grinding mill 2 from the side of the grate support element 1 directed away from the volume 28 of the grinding mill 2, in other words towards the outside 34. Depending on the embodiment, the lifter bar 32 may be removed from the grinding mill 2 either together with the grate panel 20 and the grate support element 1, or separately from the grate panel 20, in other words once the grate panel 20 has been removed.

According to an embodiment, the lifter bar 32 may be removed from the grinding mill 2, more particularly from the discharge end 10 of the grinding mill 2, from the inside of the grinding mill 2. In other words, the lifter bar 32 may be accessed and disassembled from the grinding mill 2 from the side of the grate support element 1 directed towards the volume 28 of the grinding mill. This embodiment is beneficial especially if there is no need to remove the grate support element 1, but only the grate panel 20 and/or the lifter bar 32 is removed for replacement or maintenance.

According to an embodiment, the method further comprises removing, after or simultaneously with removing the grate panel 20 and/or the lifter bar 32, at least one grate support element 1, such as a grate support element 1 according to an embodiment described in this description and accompanying drawings or a combination of the embodiments, from the grinding mill. According to an embodiment, the grate panel 20 may be removed from the grinding mill 2 first accessing it from the outside of the grinding mill 2, then the lifter bar 32 is removed accessing it from the inside, or the volume 28 side, of the grinding mill 2. The grate support element 1 may then be removed, for instance removed from the outside 34 of the grinding mill 2. According to another embodiment, the grate panel 20 may be removed from the grinding mill 2 first and then the grate support element 1 and the lifter bar(s) 32 mounted to the grate support element 1 may be removed together from the grinding mill, for instance removed from the outside 34 of the grinding mill 2. The lifter bar(s) 32 may then be disassembled from the grate support element 1, if needed. According to a further embodiment, the grate panel 20, the grate support element 1 and the lifter bar(s) may be removed from the grinding mill 2 from the outside of the grinding mill together. The grate panel 20, the grate support element 1 and/or the lifter bar 32 may then be disassembled from one another, if needed. These embodiments may be beneficial for instance if all parts need to be replaced or maintained.

In embodiments, where the at least one grate panel 20, the at least one lifter bar and the at least one grate support element 1 are removed simultaneously, this may take place for instance in such a manner, that the grate panel 20, the lifter bar 32 and the grate support element 1 are mounted to one another. According to a further embodiment, this may instead take place in such a manner that the grate panel 20 and the grate support element 1 are attached fixedly to each other and the lifter bar 32 is mounted to this structure. The grate panel 20, the lifter bar 32 and/or the grate support element 1 may be mounted to one another for instance via mounting members.

According to an embodiment, the method may comprise disassembling, after removing the grate panel 20, the lifter bar 32 and the grate support element 1 from the outside 34 of the grinding mill, the lifter bar 32 from the grate panel 20 and/or the vane 5 of the grate support element 1 by disassembling the at least one mounting member attaching the lifter bar 32 to the grate panel 20 and/or the grate support element 1, such as to a vane 5 of the grate support element 1. This disassembling action too can, thus, be done outside the volume of the grinding mill 2.

According to an embodiment, the method may further comprise removing after removing the grate panel 20 or simultaneously with removing the grate panel 20 at least one wear liner from the outside of the grinding mill 3. In embodiments, where the at least one grate panel 20 and the at least one wear liner are removed simultaneously, this may take for instance in such a manner, that the at least one grate panel 20 and the at least one wear liner are mounted to one another or they are attached fixedly to each other. The grate panel 20 and the wear liner may be mounted to each other for instance via mounting members. In different embodiments, the wear liner may also be mounted to the lifter bar 32 and/or the grate support element 1.

According to an embodiment, the grate support element 1 may be provided with a mounting flange 30 at the outer perimeter 6 of the grate support element 1 configured to mount the grate support element 1 to a shell of the grinding mill 2. In such an embodiment, removing 120 the grate support element 1 may comprise unmounting from the outside 34 of the grinding mill 2 the mounting flange 30 of the grate support element 1 from the shell 11 of the grinding mill and lifting the unmounted grate support element 1 from the grinding mill 2. According to an embodiment, the mounting flange 30 may be provided as an integral part of the grate support element 1. According to another embodiment, the mounting flange 30 may be provided as a separate part and be configured to be connected to the grate support element fixedly or removably.

Removing a grate panel 20, a grate support element 1, a wear liner and/or a lifter bar 32 from the grinding mill 2 refers to lifting the grate panel 20, grate support element 1, the wear liner and/or the lifter bar 32 from its place in the grinding mill and lifting it off to be refurbished, recycled or disposed. This is particularly beneficial when worn parts need replacement or maintenance.

Removing parts, such as a grate panel 20, a lifter bar 32 and/or a grate support element 1 from the outside 34 of the grinding mill 2 refers to accessing the parts from the outside 34 of the grinding mill and disassembling mounting members mounting or attaching the parts to the shell 11 of the grinding mill 2 from the outside 34 of the grinding mill 2. In other words, removing parts from the outside 34 of the grinding mill 2 refers to a disassembling action, where no people or machines are required to enter the volume 28 of the grinding mill to disassemble the parts of the discharge end from the rest of the grinding mill 2.

According to an embodiment, the grate 16 of the grinding mill 2 may be formed of 3 to 36 segments, whereby each of the segments forms a segment of the grate 16 in the range of 10 to 120 of the grate. In other words, a grate of a grinding mill 2 may be formed of 3 to 9 such segments mounted adjacent to one another in a circumferential manner, each inner section 4 directed towards the middle 12 of the of the cross section of the grinding mill 2, to form a round grate 16. Thus, in an embodiment, the grate 16 may for instance comprise 3 segments each forming a 120-degree segment of the grate, and in another embodiment, the grate 16 may comprise 4 segments each forming a 90-degree segment of the grate 16 and so on. A benefit of such embodiments is that the segments are lighter and easier to handle than in embodiments, where one or two segments form the discharge end structure.

According to an embodiment, the method may further comprise stopping the grinding mill 2 to such a position that grate panel 20 to be removed is provided above the charge before being removed from the grinding mill 2. For instance, the grinding mill 2 may be stopped at a position, where the grate panel to be removed is provided at the top or close to the top of the grate 16. A benefit of such embodiment is that it is easier to replace a grate panel without stopping the process completely and emptying the shell 11 from slurry and ground material for the maintenance is not necessary.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement at a discharge end of an open-ended grinding mill having a grinding mill volume, the arrangement comprising:
    a lifter bar that comprises:
        an elongated bar structure; and
        a groove portion provided in the elongated bar structure, wherein the groove portion is provided with at least one through hole opening configured to receive a mounting member,
    a grate panel having at least one through hole opening, and
    a grate support element, the grate support element including a grate support element vane having at least one opening,
    wherein the groove portion of the lifter bar is configured to open on a side of the lifter bar facing outwards from the grinding mill volume when the grate support element vane is received in the grove portion of the lifter bar,
    wherein when the grate support element vane is received in the groove portion of the lifter bar, one or both of the grate panel and the grate support element is mounted to the lifter bar by mounting members arranged in aligned openings in the grate support element vane and one or both of the grate panel and the grate support element.

2. The arrangement according to claim 1,
    wherein the lifter bar is provided on the grinding mill volume side of the vane of the grate support element and the grate panel is provided on the opposite side of the vane directed to the outside of the grinding mill volume.

3. The arrangement according to claim 1, wherein the grate support element comprises:
   at least three vanes extending from a distal end of the grate support element towards a middle end of the grate support element directed towards the middle of the cross section of the open-ended grinding mill, and
   an inner section connecting the vanes at the middle end of the grate support element.

4. The arrangement according to claim 3, wherein the vanes are provided at an angle in relation to cross-sectional plane of the open-ended grinding mill in such a manner that the middle end of the grate support element protrudes away from a grinding mill volume side of the grate support element.

5. The arrangement according to claim 3, wherein the grate support element further comprises an outer perimeter section connecting the vanes at the distal end of the grate support element.

6. The arrangement according to claim 1, wherein a plurality of grate support elements are configured to form a grate support structure.

7. The arrangement according to claim 3, wherein the inner section connecting the vanes at the middle end of the grate support element is configured to form a ring-like inner perimeter for the grate support element.

8. The arrangement according to claim 3, wherein the inner section connecting the vanes at the middle end of the grate support element is configured to form a solid round center part for the grate support element.

9. The arrangement according to claim 3, wherein the grate support element includes a plurality of vanes and wherein the arrangement includes a plurality of lifter bars such that one of the plurality of lifter bars is mounted to each of the plurality of vanes of the grate support element.

10. The arrangement according to claim 1, wherein the arrangement further comprises a wear liner mounted to the vane of the grate support element.

11. The arrangement according to claim 1, wherein
   a wear liner including at least one opening, wherein the at least one opening of the wear liner or the lifter bar is configured to be aligned with the at least one opening of the grate support element, when the wear liner or the lifter bar is mounted to the grate support element, and wherein
   the wear liner or the lifter bar is mounted to the vane of the grate support element via the same mounting member that mounts the grate support element to the grate panel.

12. The arrangement according to claim 10, wherein the grate panels form a surface that interfaces with the wear liner or the lifter bar mounted to the vane in such a manner that a seamless wear surface is formed.

* * * * *